United States Patent [19]

Miyazaki et al.

[11] Patent Number: 5,530,498
[45] Date of Patent: Jun. 25, 1996

[54] CAMERA WITH BAR CODE READING APPARATUS AND SPOOL LOCKING MECHANISM

[75] Inventors: Takemi Miyazaki; Yoshio Kakuta; Toshiki Fujisawa, all of Hachioji, Japan

[73] Assignee: Konica Corporation, Japan

[21] Appl. No.: 439,357

[22] Filed: May 11, 1995

Related U.S. Application Data

[62] Division of Ser. No. 246,365, May 19, 1994, Pat. No. 5,407,155.

[30] Foreign Application Priority Data

Jun. 15, 1993 [JP] Japan .................. 5-143781

[51] Int. Cl.⁶ .............................. G03B 7/00; G03B 17/26
[52] U.S. Cl. .............................. 354/21; 354/207; 354/275
[58] Field of Search ........................ 354/21, 207, 212, 354/214, 275, 288; 242/348, 348.4

[56] References Cited

U.S. PATENT DOCUMENTS

| | | | |
|---|---|---|---|
| 5,030,978 | 7/1991 | Stoneham et al. | 354/21 |
| 5,032,854 | 7/1991 | Smart et al. | 354/21 |
| 5,049,912 | 9/1991 | Pagano et al. | 354/275 |
| 5,079,579 | 1/1992 | Pagano et al. | 354/288 |
| 5,115,268 | 5/1992 | Kitagawa et al. | 354/275 |
| 5,321,455 | 6/1994 | Cocca | 354/207 |
| 5,363,167 | 11/1994 | Takatori | 354/275 |

FOREIGN PATENT DOCUMENTS 4-237043  8/1992  Japan.

Primary Examiner—Michael L. Gellner
Assistant Examiner—J. K. Han
Attorney, Agent, or Firm—Jordan B. Bierman; Bierman and Muserlian

[57] ABSTRACT

A camera for reading film information expressed with a bar code, which is provided on a bar code plate being rotatable with a spool of a film cartridge, through a window of the film cartridge. The camera includes: a driver for rotating the spool; an optical reading device for reading the bar code, and for generating a bar code information including the film information; a detecting circuit for detecting a reference position of the bar code according to the bar code information, and a memory device for storing the bar code information being read by the optical reading device. In the camera, the driver rotates the spool in a film rewinding direction after a film in the film cartridge is rewound so that the detector circuit detects the reference position of the bar code according to the bar code information stored in the memory device, and the driver rotates the spool according to the reference position so as to locate a bar code portion corresponding to exposed state of the film. The camera further includes a release pin for releasing a spool locking mechanism which cannot be inadvertently released during the cartridge loading or cartridge removal.

1 Claim, 7 Drawing Sheets

1

CAMERA WITH BAR CODE READING APPARATUS AND SPOOL LOCKING MECHANISM

This application is a division of application Ser. No. 08/246,365, filed May 19, 1994, U.S. Pat. No. 5,407,155.

BACKGROUND OF THE INVENTION

The present invention relates to a camera in which a cartridge is used, wherein a photographic film is loaded in the cartridge, and a bar code, which can be read from the outside of the cartridge, and a lock mechanism of a spool are provided in the cartridge.

As a prior art with respect to a cartridge in which a film is loaded, and a circular bar code readable from the outside thereof and a lock mechanism of a spool are provided, for example, the following has been disclosed: Japanese Patent Publication Open to Public Inspection No. 237043/1992.

On the cartridge in this publication, a circular bar code plate, on which a bar code is written, is provided. With this bar code, the film sensitivity, and the number of exposable frames are displayed. This bar code plate is rotated with the spool around which the film is wound. In order to memorize information of the bar code in a camera, automatic film loading is conducted in the camera after the cartridge has been loaded in the camera, and the information is stored in the camera until the first frame of the film is wound. However, when the film of the cartridge is automatically loaded, since, initially, the spool provided in the cartridge is rotated so that the film is fed, the rotation of the bar code plate is slow. However, after the leading edge of the film, which was drawn out, has been engaged with a winding reel, the film is wound up by the reel. Accordingly, the rotation of the bar code plate is faster. As described above, since the number of rotations is changed within a short period of time, reading errors easily occur. When information such as a film sensitivity and the number of exposable frames are stored erroneously, serious problems occur.

Further, in this publication, a prevention mechanism of cartridge loading into the camera has been disclosed so that exposed film is not erroneously used again. However, since this mechanism is a mechanical, there is a possibility that problems occur, and cost is raised by this mechanism.

Still further, the spool lock mechanism has been disclosed in the publication. However, the relationship between the rotational portion of the spool and a driving shaft of the camera, or the relationship between the lock mechanism and a release pin of the camera, is not specifically regulated. Accordingly, there are problems in which the lock is inadvertently released during the cartridge loading operation, or cartridge removal operation, and the spool is rotated, so that the bar code plate is also rotated.

In view of the foregoing problems of the conventional technology, the present invention accomplishes the following 3 objectives.

① A camera which positively reads out the film information on the bar code provided on the cartridge.

② A camera in which film re-feeding can be prevented when an exposed cartridge is erroneously loaded in the camera.

③ A camera in which a lock can not inadvertently be released during the cartridge loading or cartridge removal.

SUMMARY OF THE INVENTION

The foregoing objectives can be accomplished by a camera, according to the present invention, using a cartridge having: a spool around which a photographic film is wound; a bar code plate on which a bar code, expressing film information, is provided, and which is integrally rotated with the spool; and a small window through which the bar code can be detected from the outside of the cartridge. In the camera, a drive for rotating the spool, a reader for detecting a reference position of the bar code, and for reading film information from the bar code, and a storage for storing the read out bar code information, are provided. The camera is further characterized in that: the camera reads out the film information, and the film information is stored in the camera by the storage, after the cartridge is loaded in the camera, the spool is rotated in the direction in which a film is wound into the cartridge by the drive, and the reference position of the bar code rotated by the reader is detected.

DETAILED DESCRIPTION OF THE INVENTION

Referring to FIGS. 1 to 7, an example of the present invention will be described in detail below.

Figure 1:
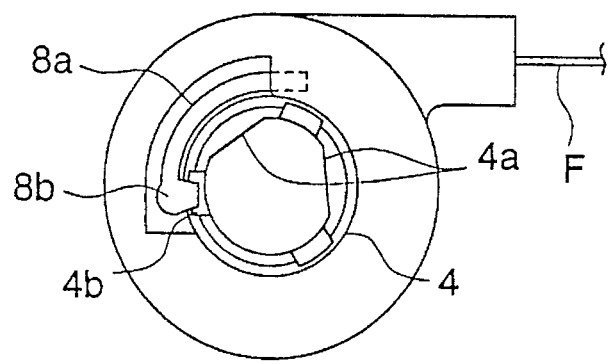
FIG. 1(a) is a plan view of a cartridge in which a film is accommodated.
FIG. 1(b) is a vertical sectional view of the cartridge.
Figure 1:
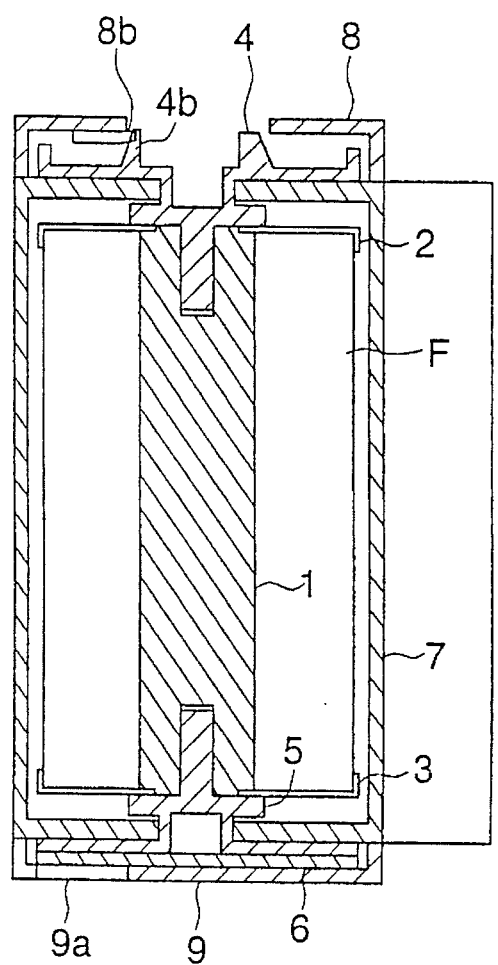

FIG. 1 is a view showing a cartridge, which is used for the present invention, and in which a photographic film is accommodated. FIG. 1(a) is a plan view and FIG. 1(b) is a vertical sectional view of the cartridge. The film F is wound around a spool 1. Both end portions of the film are regulated by film holders 2 and 3 in order to prevent loose winding. Numeral 4 is a rotation shaft which receives the driving force from the camera by the side surface portion 4a of a recess, and has lock grooves 4b for stopping the rotation at intervals of 120 degrees. The rotation shaft 4 is integrally fixed to the spool 1 with the film holder 2. Numeral 5 is a bearing, to which a bar code plate 6 is fixed, and integrally fixed to the spool 1 with the film holder 3. Numeral 7 is a casing in which a film is accommodated, and is shaped so that leakage of light can be prevented. The casing is made of material to prevent the leakage of light. The rotation shaft 4 and the bearing 5 are rotatable at both ends of the casing. Numeral 8 is a cap A, which has an arm 8a. When the cartridge is not loaded in the camera, the lock grooves 4b of the rotation shaft 4 are locked by a stopper 8b provided at a tip portion of the arm 8a, and the rotation of the rotation shaft 4, that is, the rotation of the spool 1 is prevented. Numeral 9 is a cap B which protects the circular bar code plate 6. The bar code provided on the circular bar code plate 6 can be seen through a window 9a, or can be detected by a bar code reading apparatus.

Figure 2:
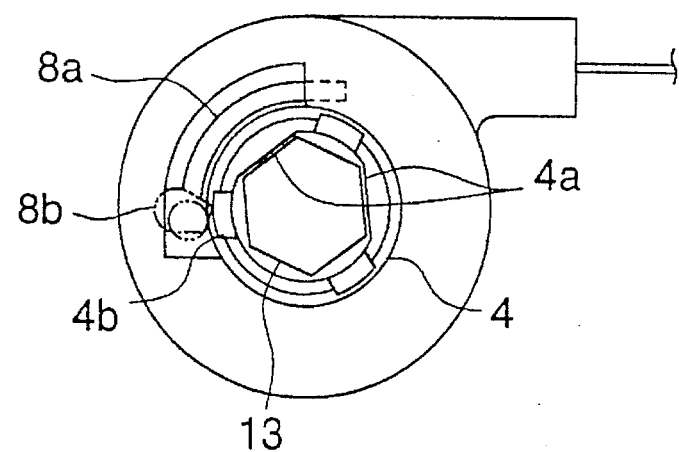
FIG. 2(a) is a plan view when the cartridge is loaded in a camera.
FIG. 2(b) is a vertical sectional view when the cartridge is loaded in the camera.
Figure 2:
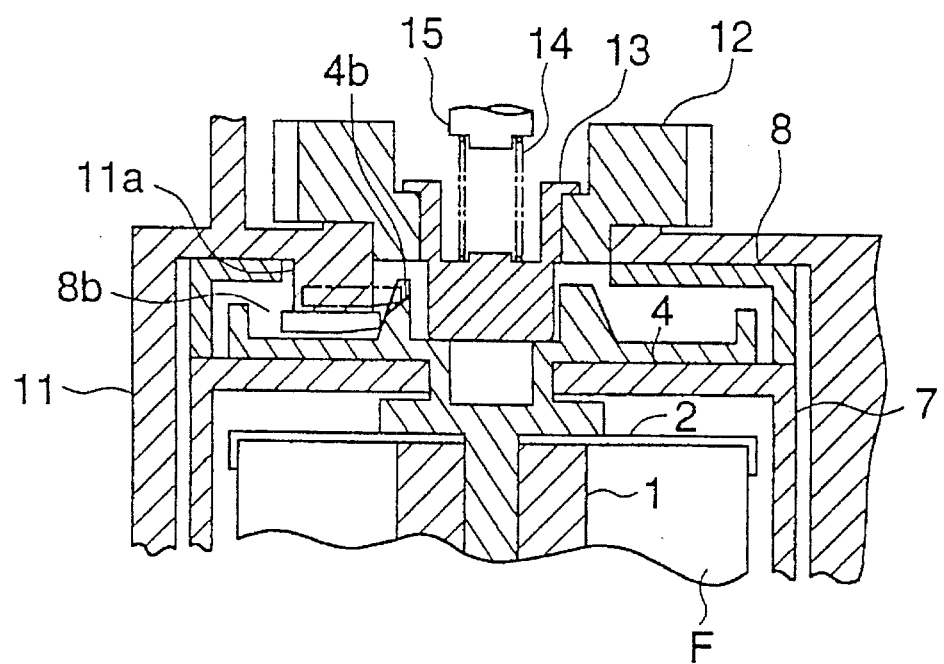

FIG. 2 is a view showing engaging portions when the cartridge is loaded in the camera. FIG. 2(a) is a plan view, and FIG. 2(b) is a vertical sectional view. Parts of the cartridge are numbered with the same numbers as those of FIG. 1.

Numeral 11 is a camera body, and a driving gear 12 is rotatably engaged with the camera body 11. A driving shaft 13 is provided in the driving gear 12. The driving shaft 13 can be moved in the direction of thrust with respect to the driving gear 12, and is integrally rotated with the driving gear 12 in either direction. Numeral 14 is a compression spring, which presses the driving shaft 13 toward the rotation shaft 4 of the cartridge with respect to a rotatable spring holder 15. A release pin 11a is fixed to the inside of the cartridge room of the camera body 11. In the case where the cartridge is loaded in the camera, when the release pin 11a presses the stopper 8b of a cap A8, the stopper 8b moves outside along the inclined surface of the lock groove 4b, and the rotation shaft 4, that is, the spool 1 can be rotated. The tip of the driving shaft is hexagonal, and is engaged with the side surface portion 4a. When the driving gear 12 is driven, the driving shaft 13 is also driven, and the rotation shaft 4, that is, the spool 1 is rotated.

Examples of the camera using the above-described cartridge will be described below.

Figure 3:
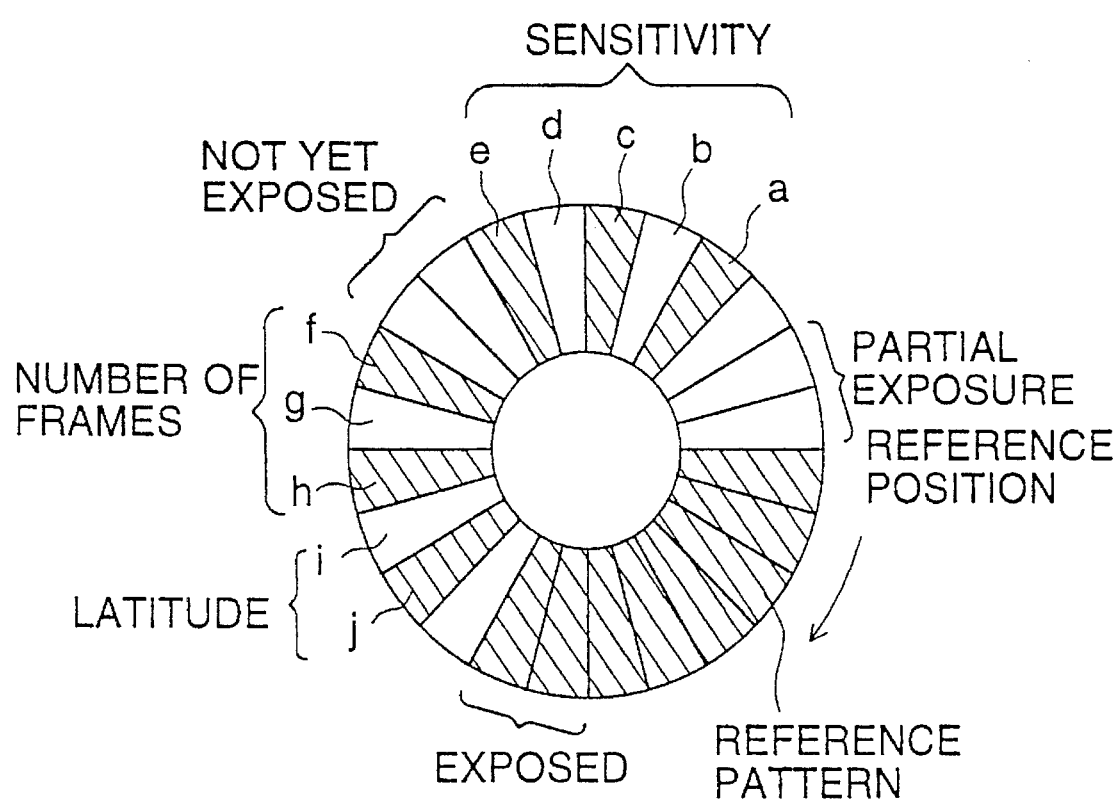
FIG. 3 is a view showing a circular bar code.

① Film information of the cartridge is displayed by the bar code of the bar code plate 6 (the bar code is shown in FIG. 3). In FIG. 3, a slanting line represents a black pattern, and a white background represents a white pattern. "a" to "e" express the film sensitivity, "f" to "h" express the number of frames of the photographic film and "i" and "j" express the latitude. The film information expressed by these patterns is shown in Table 1. In Table 1, B means a black pattern, and W means a white pattern.

TABLE 1

| | Film sensitivity pattern | | | | |
| | Bar code area | | | | |
| ISO sensitivity | a | b | c | d | e |
| --- | --- | --- | --- | --- | --- |
| 25 | B | B | B | W | B |
| 32 | B | B | B | B | W |
| 40 | B | B | B | W | W |
| 50 | W | B | B | W | B |
| 64 | W | B | B | B | W |
| 80 | W | B | B | W | W |
| 100 | B | W | B | W | B |
| 125 | B | W | B | B | W |
| 160 | B | W | B | W | W |
| 200 | W | W | B | W | B |
| 250 | W | W | B | B | W |
| 320 | W | W | B | W | W |
| 400 | B | B | W | W | B |
| 500 | B | B | W | B | W |
| 640 | B | B | W | W | W |
| 800 | W | B | W | W | B |
| 1000 | W | B | W | B | W |
| 1250 | W | B | W | W | W |
| 1600 | B | W | W | W | B |
| 2000 | B | W | W | B | W |
| 2500 | B | W | W | W | W |
| 3200 | W | W | W | W | B |
| 4000 | W | W | W | B | W |
| 5000 | W | W | W | W | W |

Frame number pattern

Bar code area

TABLE 1-continued

| Frame number | f | g | h |
| --- | --- | --- | --- |
| — | B | B | B |
| 12 | W | B | B |
| 20 | B | W | B |
| 24 | W | W | B |
| 36 | B | B | W |
| 48 | W | B | W |
| 60 | B | W | W |
| 72 | W | W | W |

Latitude pattern

| | Bar code area | |
| Exposure range | i | j |
| --- | --- | --- |
| ±½ | B | B |
| ±1 | W | B |
| +2, −1 | B | W |
| +3, −1 | W | W |

Although the detail is described later, patterns which represent "not yet exposed", "partially exposed", and "exposed" film, are provided at intervals of 120 degrees. Further, black patterns, in which at least 6 patterns are successively continued, are provided as the reference pattern.

Figure 4:
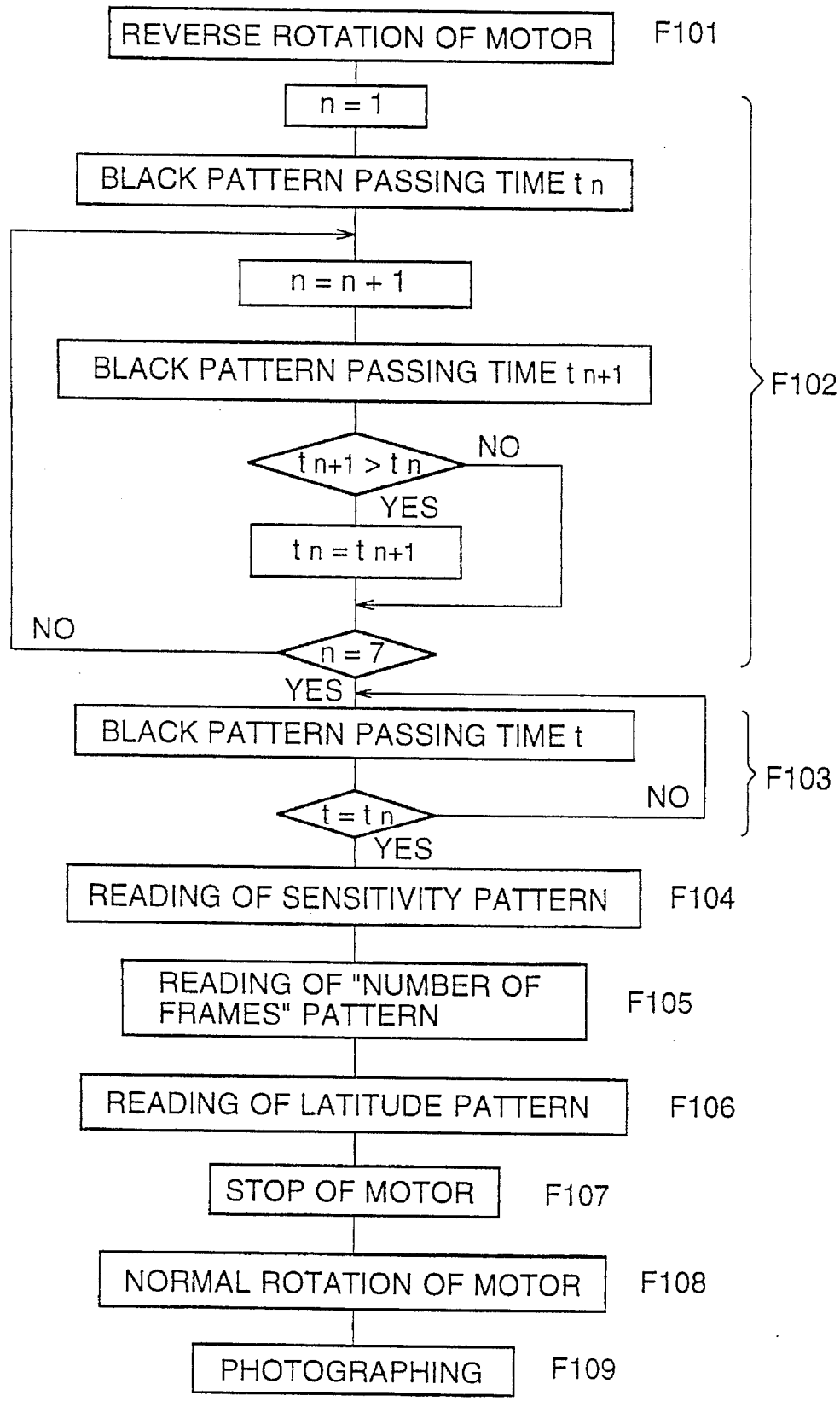
FIG. 4 is a flow chart used when the bar code is read out by the camera.
Figure 5:
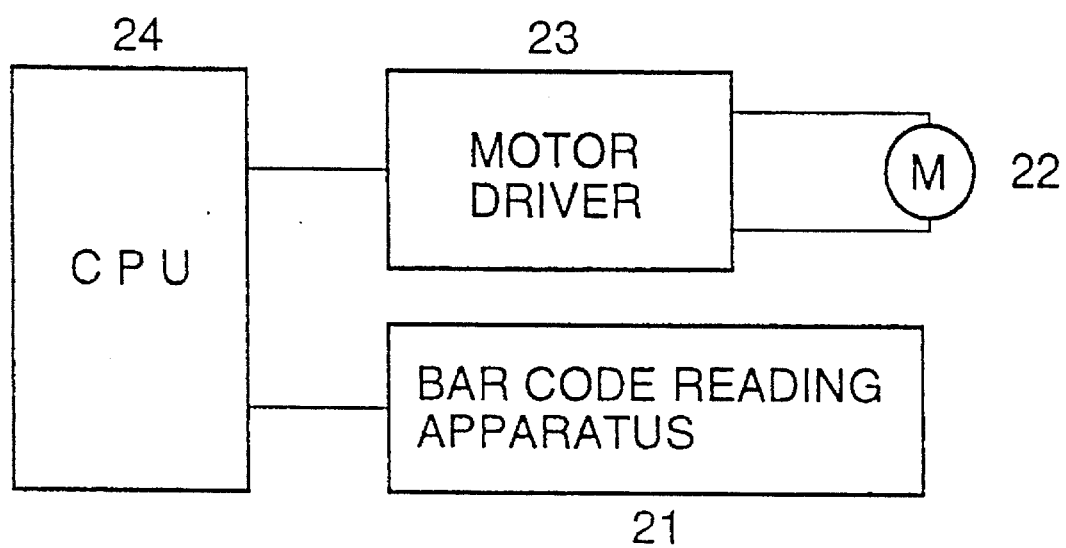
FIG. 5 is a block diagram showing a bar code reading system.
Figure 6:
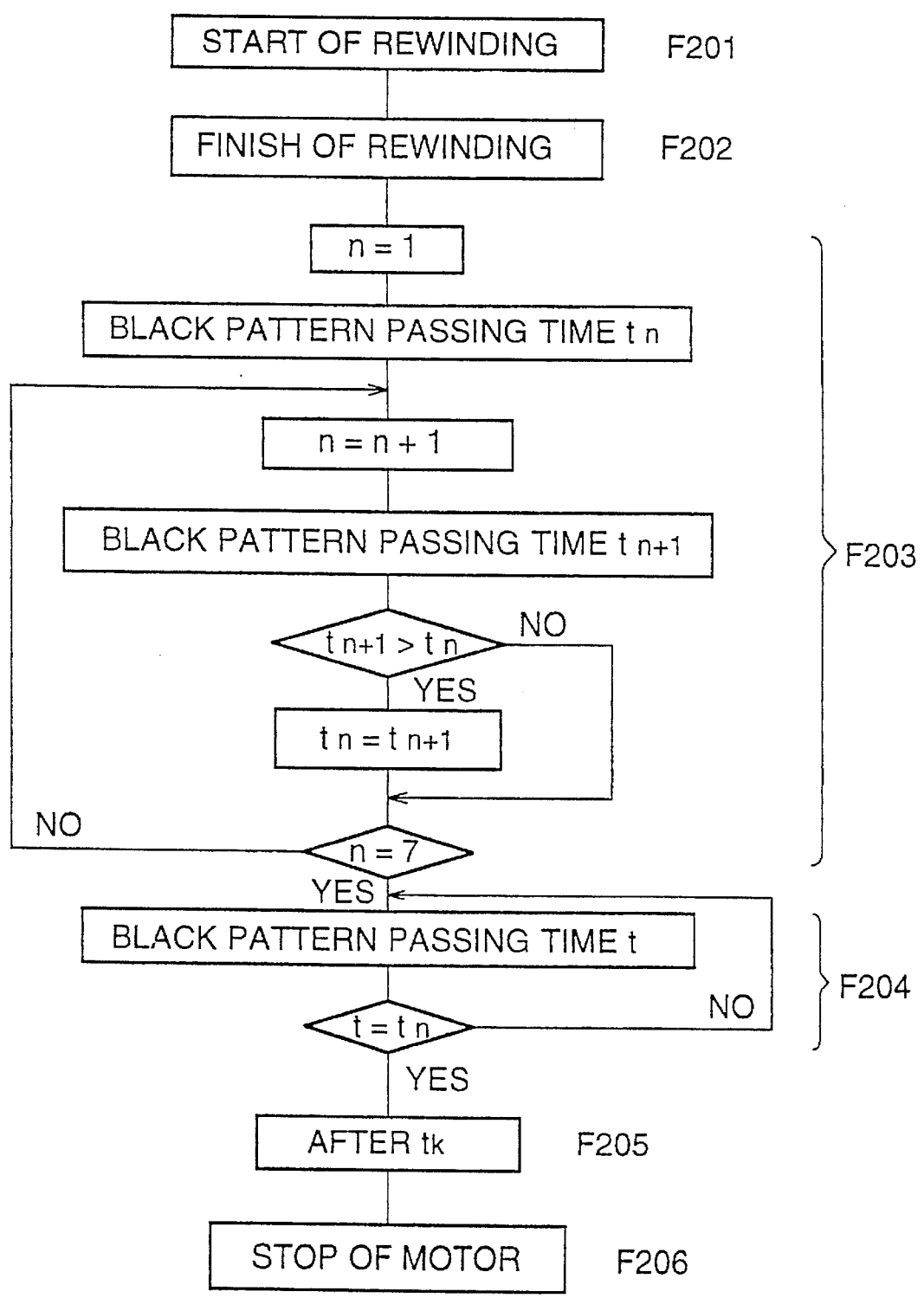
FIG. 6 is a flow chart for displaying whether the film is exposed or not.

A flow chart, in which the above described circular bar code is read by the camera, is shown in FIG. 4. When the cartridge is loaded in the camera and the rear cover is closed, a motor reverses, and the rotation shaft 4, that is, the spool 1 is rotated in the direction of film winding by the driving shaft 13 through the driving gear 12. Accordingly, the bar code plate 6 is rotated, and the bar code is rotated in the arrowed direction in FIG. 3 (F101). Although not shown in the drawings, a bar code reading apparatus using a photoreflector is provided near the window 9a shown in FIG. 1, detects the rotating bar code pattern and reads the pattern. Initially, the reference pattern is found in the rotating bar code pattern. Even when patterns "a" to "e" or "f" to "j" are all black, since the reference pattern has a longer continuous black pattern, when the patterns are compared with each other, it can be found that the pattern having the longest black pattern is the reference pattern (F102). The maximum appearance times of the black patterns can be 7 per rotation of the circular bar code plate. Accordingly, 7 black patterns are counted from the time when rotation of the bar code plate starts, and then, times in which the black patterns on the bar code plate, rotating at a predetermined speed, respectively pass the photoreflector are determined as $t_1$ to $t_7$. Then, the reference position can be detected from a predetermined length of the reference pattern (F103). The sensitivity pattern (F104), the frame number pattern (F105), and the latitude pattern (F106) can be read and stored, based on the reference position. After that, the motor is stopped once (F107), the motor is rotated in the normal direction (F108), the film is advanced for automatic loading, and the camera is ready for photography use (F109). FIG. 5 is a block diagram of the flow chart. Numeral 21 is a bar code reading apparatus, numeral 22 is a film feeding motor, numeral 23 is a motor driver for the film feeding motor 22, and numeral 24 is a CPU by which the bar code is decoded for storing, and the motor is controlled.

As described above, since the motor is reversed and the bar code is read out prior to photographing, sufficient time can be taken for reading. Further, since the speed of the motor is stable, film information can be positively read out.

② An example displaying that the film is exposed or not.

After the cartridge is loaded into the camera, and film information is stored in the CPU as described above, automatic loading is conducted and photographing is carried out. The CPU stores data in the following 3 cases: (1) automatic loading fails for some reason, and photographing can not be carried out, or the film is rewound before exposure (the film is not exposed); (2) photographing is carried out, but all the number of frames of the film are not exposed; (3) all the predetermined number of frames of the film are exposed. After that, rewinding is conducted. The following processes are described below referring to the flow chart shown in FIG. 6. In the flow chart, rewinding is started (F201), and then, rewinding is completed (F202), but the feeding motor is not stopped, and rotation continues. The bar code is read in the same way as the foregoing, the reference pattern is read in step (F203), and the reference position is detected in step (F204). After that, the CPU controls the amount of the rotation of the bar code from the reference pattern corresponding to the status of exposure stored in the CPU (F205), and one of patterns expressing "not yet exposed", "partially exposed", and "exposed" is stopped at the position of the bar code detecting apparatus (F206). Accordingly, when the bar code is observed from the window 9a of the cartridge, it can be discriminated according to the color of the bar code that the film is exposed or not.

In the case where the bar code representing "exposed" has been displayed, even when the cartridge is loaded again into the camera, the CPU reads that the pattern, located at the position of the small window, is black and does not drive the feeding motor.

③ An example in which regulation is provided to the cartridge in order to prevent the lock mechanism from being inadvertently released when the cartridge is loaded into or removed from the camera.

In FIG. 2, when the cartridge is loaded into the camera as described above, the lock between the stopper 8b and the lock groove 4b of the cartridge is released by the release pin 11a of the main body 11, and the driving shaft 13 of the camera is engaged with the rotation shaft 4 of the cartridge. However, in the case where timing of the lock releasing and shaft engaging is not appropriate, when the cartridge is loaded, the shaft is engaged after the lock has been released, and accordingly, there is a possibility that the bar code is shifted. Further, when the cartridge is taken out, the shaft is sometimes disengaged before locking is carried out by the lock mechanism. At this time, the bar code is shifted, and accordingly, there is possibility that the display of "exposed" or "not exposed yet" is shifted. In order to solve such problems, when the cartridge is loaded, these mechanisms are preferably structured in the manner that the shaft is engaged before the lock is released. Further, when the cartridge is taken out, these mechanisms are preferably structured in the manner that the shaft is disengaged after locking has been conducted by the lock mechanism.

Figure 7:
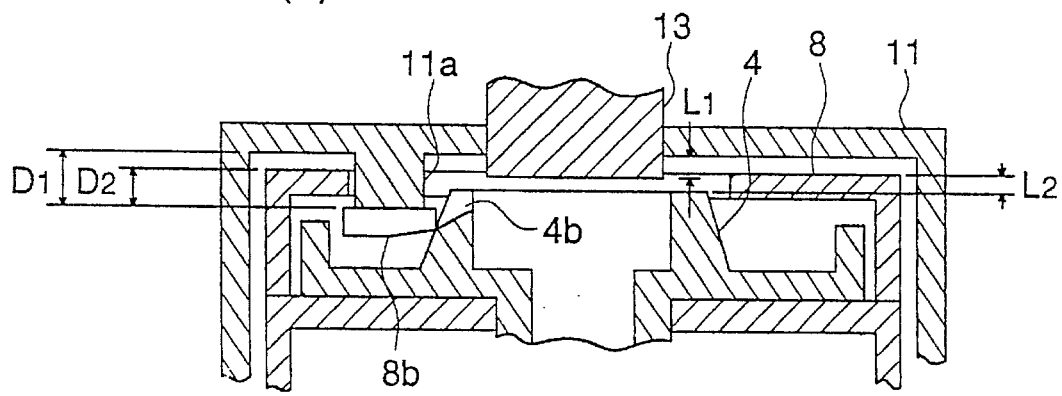
FIGS. 7(a), 7(b) and 7(c) are views showing various relationship of a lock mechanism and a shaft.
Figure 7:
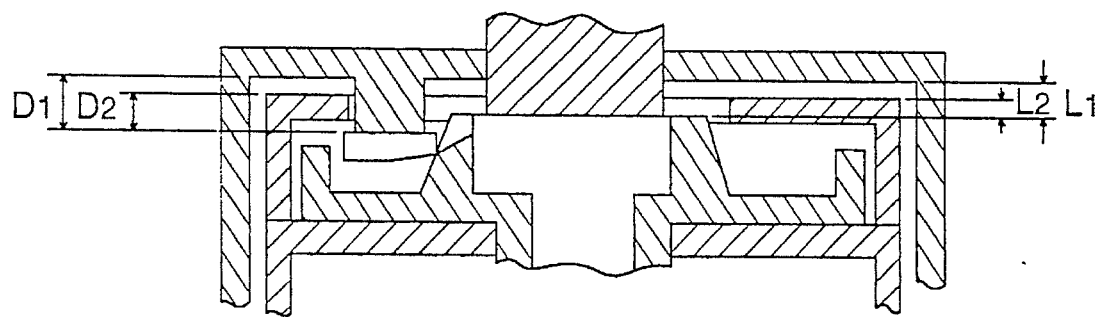
Figure 7:
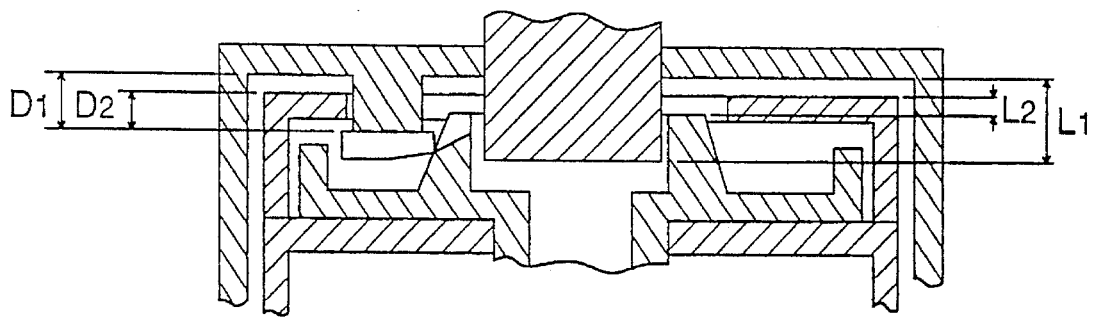

FIG. 7 is a view showing the relationship between the lock mechanism and the shaft; and each part has the same code and number as that in FIG. 2. In FIG. 7, when the upper surface of the cartridge room of the camera body is used as the reference, the distance to the fore end of the release pin 11a is $D_1$, the distance to the lower surface of the driving shaft 13 is $L_1$. When the upper surface of the cap 8 of the cartridge is used as the reference, the distance to the upper surface of the stopper 8b at the instant when the stopper 8b is disengaged from the lock groove 4b, is $D_2$, and the distance to the upper surface of the rotation shaft 4 is $L_2$.

In FIG. 7(a), since the relationship $L_1-L_2<D_1-D_2$ can be obtained, the driving shaft 13 is engaged with the rotation shaft 4 after the stopper 8b has been released when the film is loaded into the camera. When the film is removed from the camera, the driving shaft 13 is disengaged from the rotation shaft before the stopper 8b is locked.

In FIG. 7(b), since the relationship $L_1-L_2=D_1-D_2$ can be obtained, release of the stopper 8b and engagement of the driving shaft 13 with the rotation shaft 4 are concurrently conducted when the film is loaded into the camera. When the film is removed from the camera, lock of the stopper 8b and disengagement of the driving shaft 13 from the rotation shaft 4 are concurrently conducted.

In FIG. 7(c), since the relationship $L_1-L_2>D_1-D_2$ can be obtained, the driving shaft 13 is engaged with the rotation shaft 4 before the stopper 8b is released when the film is loaded into the camera. When the film is removed from the camera, the driving shaft 13 is disengaged from the rotation shaft 4 after the stopper 8b has been locked.

Accordingly, in the case where the relationship $L_1-L_2>D_1-D_2$ is satisfied, the rotation shaft 4 is not inadvertently shifted and the position of the bar code is not shifted when the film is loaded into or removed from the camera.

As described in detail above, according to the invention, in a camera which uses: a spool, around which a photographic film is wound; a circular bar code plate which has a bar code, expressing film information thereon, and is rotated integrally with the spool; and a cartridge which has a small window for detecting the bar code from the outside, film information can be stably and positively read from the bar code. Further, even when an exposed cartridge is erroneously reloaded into the camera, since the camera drive is stopped not by mechanical but by electrical means, there is no possibility of mechanical breakdown. Further, the position of the bar code is not shifted since the lock is not inadvertently released during loading of the cartridge or during removal of the cartridge.

What is claimed is:

1. A camera for reading film information expressed with a bar code, which is provided on a bar code plate being rotatable with a spool of a film cartridge, through a window of said film cartridge, said cartridge being in a cartridge chamber in said camera, said camera comprising:

a drive for rotating said spool;

a reader for reading said bar code, and for generating a bar code information including said film information;

a detector for detecting a reference position of said bar code according to said bar code information; and a storage for storing said bar code information being read by said reader;

wherein said drive rotates said spool in a film rewinding direction after a film in said film cartridge is rewound so that said detector detects said reference position of said bar code according to said bar code information stored previously in said storage, and said drive rotates said spool according to said reference position so as to locate a bar code portion corresponding to exposed state of said film, at said window of said film cartridge;

a control for preventing said drive from rotating said spool when said reader reads said bar code portion, which portion corresponds to an exposed state of said film, at said window of said film cartridge;

a release for releasing a locking mechanism of said bar code plate; and a drive shaft for engaging said drive and said spool of said film cartridge;

said chamber having an inner surface, said release, terminating in an end face, extending inwardly and parallel to an axis of said spool for a length $D_1$, said cartridge having a cap with an outer surface, on an adjacent end of said cartridge, said surface being adjacent to and spaced apart from said inner surface, length $D_2$ being a distance between said outer surface and said end face, said drive including a drive shaft adapted to engage in rotation shaft to rotate said spool, length $L_1$, being a distance between said inner surface and a lower surface of said drive shaft, length $L_2$ being a distance between said outer surface and a top surface of said rotation shaft, wherein said cartridge, when in said camera, satisfies $L_1 - L_2 > D_1 - D_2$.

* * * * *